United States Patent
Todoroki

(10) Patent No.: US 10,946,700 B2
(45) Date of Patent: Mar. 16, 2021

(54) HEAVY DUTY PNEUMATIC TIRE

(71) Applicant: SUMITOMO RUBBER INDUSTRIES, LTD., Kobe (JP)

(72) Inventor: Daisuke Todoroki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 544 days.

(21) Appl. No.: 15/362,884

(22) Filed: Nov. 29, 2016

(65) Prior Publication Data

US 2017/0166012 A1    Jun. 15, 2017

(30) Foreign Application Priority Data

Dec. 14, 2015 (JP) .............................. JP2015-243338

(51) Int. Cl.
B60C 11/00 (2006.01)
(52) U.S. Cl.
CPC ..... B60C 11/005 (2013.01); *B60C 2011/0025* (2013.01); *B60C 2011/0033* (2013.01); *B60C 2200/06* (2013.01); *Y02T 10/86* (2013.01)
(58) Field of Classification Search
CPC ........................... B60C 11/005; B60C 11/0075
See application file for complete search history.

(56) References Cited

U.S. PATENT DOCUMENTS

| | | | |
|---|---|---|---|
| 6,216,757 B1 | 4/2001 | Ohara et al. | |
| 2004/0069392 A1* | 4/2004 | Maruoka | B60C 3/04 152/454 |
| 2006/0048874 A1 | 3/2006 | Maruoka | |
| 2008/0264543 A1* | 10/2008 | Montanaro | B60C 9/2006 152/532 |

FOREIGN PATENT DOCUMENTS

| | | | |
|---|---|---|---|
| EP | 0 543 620 A1 | 5/1993 | |
| EP | 1 630 003 A1 | 3/2006 | |
| JP | 55152612 A | * 11/1980 | ........... B60C 11/005 |
| JP | 62015104 A | * 1/1987 | |
| JP | 63149202 A | * 6/1988 | |

(Continued)

OTHER PUBLICATIONS

Machine Translation: JP-2003127613-A; Maruoka, Kiyoto; (Year: 2019).*

(Continued)

*Primary Examiner* — Kendra Ly
(74) *Attorney, Agent, or Firm* — Oblon, McClelland, Maier & Neustadt, L.L.P.

(57) ABSTRACT

A heavy duty pneumatic tire includes a tread, a pair of side walls, and a belt. The tread includes a base layer and a cap layer on the base layer such that boundary between the base layer and the cap layer is exposed on the side surfaces of the tread and the boundary on the side surfaces is on radial direction inner side of the edges of the side walls, and the tread is formed such that when an imaginary line passing through edge of the belt and extending in axial direction is set and a portion of the imaginary line intersecting the tread is a line segment AL, a ratio of width of the base layer in width of the tread is 70% or more where the width of the tread is length of the segment AL, and the base layer has a loss tangent of 0.06 or less.

20 Claims, 2 Drawing Sheets

(56) References Cited

FOREIGN PATENT DOCUMENTS

| JP | 5-254314 A | | 10/1993 | | |
|---|---|---|---|---|---|
| JP | 11-301209 A | | 11/1999 | | |
| JP | 2003127613 A | * | 5/2003 | ........... | B60C 11/005 |
| JP | 2012-111269 A | | 6/2012 | | |
| JP | 2012111269 A | * | 6/2012 | | |
| JP | 2012183884 A | * | 9/2012 | | |

OTHER PUBLICATIONS

Machine Translation: JP-2012111269-A; Nakano, Tomoya; (Year: 2019).*
Machine Translation: JP-2012183884-A;Okazaki, Takuya; (Year: 2019).*
Machine Translation: JP-63149202-A; Kaga, Yukio; (Year: 2020).*
Machine Translation: JP-62015104-A; Takino, Hiroshi; (Year: 2020).*
Machine Translation: JP-55152612-A, Kawaguchi, Yasumi, (Year: 2020).*
Extended European Search Report dated Mar. 5, 2017 in Patent Application No. 16199070.0.

* cited by examiner

HEAVY DUTY PNEUMATIC TIRE

CROSS-REFERENCE TO RELATED APPLICATIONS

The present application is based upon and claims the benefit of priority to Japanese Patent Application No. 2015-243338, filed Dec. 14, 2015, the entire contents of which are incorporated herein by reference.

BACKGROUND OF THE INVENTION

Field of the Invention

The present invention relates to a heavy duty pneumatic tire.

Description of Background Art

In a tire described in Japanese Patent Laid-Open Publication No. 2012-111269, a low heat generation under tread rubber is adopted for a tread, and the tread is formed such that the under tread rubber covers an edge of a belt. The entire contents of this publication are incorporated herein by reference.

SUMMARY OF THE INVENTION

According to one aspect of the present invention, a heavy duty pneumatic tire includes a tread having a tread surface and a pair of side surfaces such that the side surfaces are extending from edges of the tread surface substantially inward in a radial direction, respectively, a pair of side walls extending from the side surfaces substantially inward in the radial direction respectively such that the side walls have edges positioned on axial direction outer sides of the side surfaces, respectively, and a belt positioned on a radial direction inner side of the tread. The tread includes a base layer covering the belt and a cap layer laminated on the base layer such that a boundary between the base layer and the cap layer is exposed on the side surfaces and that the boundary on the side surfaces is positioned on a radial direction inner side of the edges of the side walls, and the tread is formed such that when an imaginary line passing through an edge of the belt and extending in an axial direction is set and a portion of the imaginary line intersecting the tread is a line segment AL, a ratio of a width of the base layer in a width of the tread is 70% or more where the width of the tread is represented by a length of the line segment AL, and the base layer has a loss tangent of 0.06 or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
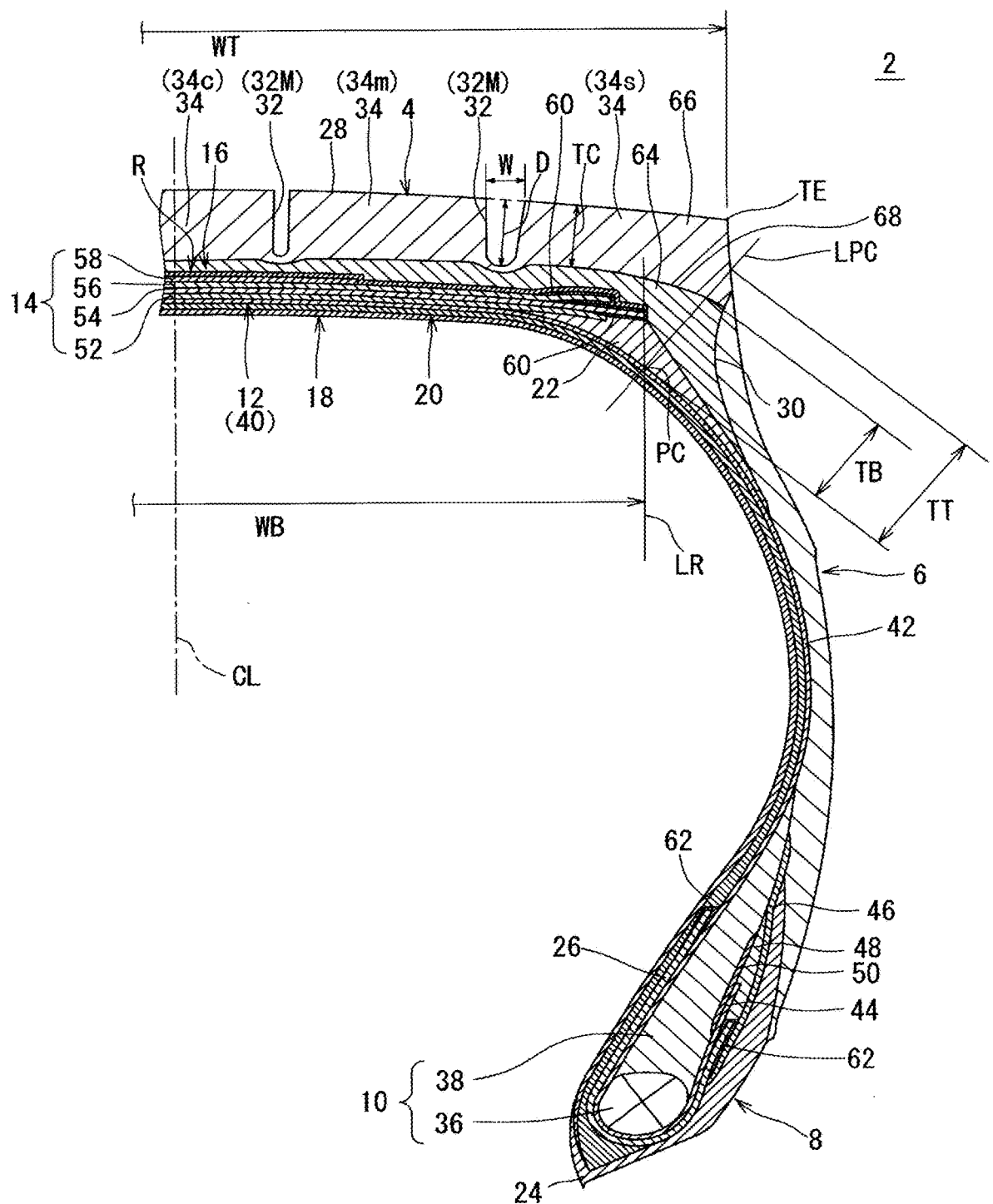
FIG. 1 is a cross-sectional view in which a portion of a pneumatic tire according to an embodiment of the present invention is illustrated.

The embodiments will now be described with reference to the accompanying drawings, wherein like reference numerals designate corresponding or identical elements throughout the various drawings.

FIG. 1 illustrates a pneumatic tire 2. In FIG. 1, an up-down direction is a radial direction of the tire 2; a left-right direction is an axial direction of the tire 2; and a direction perpendicular to a paper surface is a circumferential direction of the tire 2. In FIG. 1, a one-dotted chain line (CL) indicates an equatorial plane of the tire 2. The tire 2 has a shape that is symmetrical with respect to the equatorial plane except for a tread pattern.

The tire 2 includes a tread 4, a pair of side walls 6, a pair of clinches 8, a pair of beads 10, a carcass 12, a belt 14, a band 16, an inner liner 18, an insulation 20, a pair of cushion layers 22, a pair of chafers 24 and a pair of fillers 26. The tire 2 is of a tubeless type. The tire 2 is to be mounted to a truck, a bus or the like. The tire 2 is for a heavy load.

The tread 4 has a shape that is convex outward in the radial direction. A radial direction outer-side surface 28 of the tread 4 touches a road surface. The outer-side surface 28 is also referred to as a tread surface. In FIG. 1, a reference numeral symbol (TE) indicates an edge of the outer-side surface 28, that is, an edge of the tread surface 28. An axial direction outer-side surface 30 of the tread 4 extends substantially inward in the radial direction from the edge (TE) of the tread surface 28. In an embodiment of the present invention, this outer-side surface 30 is referred to as a side surface. The tread 4 has the tread surface 28 and the pair of the side surfaces 30. The side surfaces 30 respectively extend substantially inward in the radial direction from the edges (TE) of the tread surface 28.

As illustrated in FIG. 1, a groove 32 is engraved in the tread 4 of the tire 2. The tread pattern is formed by the groove 32.

In the tire 2, the tread pattern includes multiple main grooves (32M). The main grooves (32M) each continuously extend in the circumferential direction. In FIG. 1, a double-headed arrow (W) indicates a width of each of the main grooves (32M). A double-headed arrow (D) indicates a depth of each of the main grooves (32M).

In the tire, from a point of view of drainage performance and ensuring the rigidity of the tread 4, it is preferable that the width (W) of each of the main grooves (32M) be set to 1% or more and 7% or less of a ground contact width. From the point of view of the drainage performance and ensuring the rigidity of the tread 4, the depth (D) of each of the main grooves (32M) is preferably 10.0 mm or more and more preferably 12.0 mm or more. The depth (D) is preferably 22.0 mm or less and more preferably 20.0 mm or less.

In an embodiment of the present invention, in a state in which the tire 2 is mounted to a normal rim and air is filled in the tire 2 such that the tire 2 has a normal internal pressure, the ground contact width is an axial direction maximum width of a ground contact surface that is obtained by loading a normal load to the tire 2, setting an camber angle to 0 degree and grounding the tire 2 on a flat surface.

In the tire 2, by engraving the multiple main grooves (32M), multiple land portions 34 that are parallel-aligned in the axial direction are formed in the tread 4. An axial direction width of each of the land portions 34 is appropriately determined by taking into account the width, the number, positions and the like of the main grooves (32M).

In the tire 2, the land portions 34 are each a single unit that continuously extends in the circumferential direction. Such land portions 34 are also referred to as ribs. The land portions 34 of the tire 2 are formed from ribs that extend in the circumferential direction. In the tire 2, a rib (34c) positioned on the equatorial plane is also referred to as a center rib. In the axial direction, a rib positioned on an outer side is also referred to as a shoulder rib (34s). A rib (34m)

positioned between the center rib (34c) and the shoulder rib (34s) is also referred to as a middle rib. In the tire 2, it is also possible that, by engraving multiple grooves 32 that extend substantially in the axial direction in the land portions 34, the land portions 34 are formed by multiple blocks that are parallel-aligned in the circumferential direction. In the tire 2, a portion where a shoulder rib (34s) is provided is also referred to as a shoulder portion. A portion between the left and right shoulder portions is also referred to as a center portion.

Radial direction outer side portions of the side walls 6, that is, edges of the side walls 6, are respectively positioned on axial direction outer sides of the side surfaces 30 of the tread 4. The side walls 6 respectively extend from the side surfaces 30 substantially inward in the radial direction. The other edges of the side walls 6, that is, radial direction inner side portions of the side walls 6, are respectively bonded to the clinches 8. The side walls 6 are respectively positioned on axial direction outer sides of the carcass 12. The side walls 6 are each formed of a crosslinked rubber that is excellent in cut resistance and weather resistance. The side walls 6 prevent the carcass 12 from being damaged.

The clinches 8 are respectively positioned on substantially radial direction inner sides of the side walls 6. The clinches 8 are respectively positioned on axial direction outer sides of the beads 10 and the carcass 12. The clinches 8 are each formed of a crosslinked rubber that is excellent in wear resistance. Although not illustrated in the drawings, the clinches 8 are respectively in contact with flanges of a rim.

The beads 10 are respectively positioned on axial direction inner sides of the clinches 8. The beads 10 each include a core 36 and an apex 38 that extends from the core 36 outward in the radial direction. The core 36 is in a ring shape and includes a wound non-stretchable wire. A typical material of the wire is steel. The apex 38 is tapered outward in the radial direction. The apex 38 is formed of a high-hardness crosslinked rubber.

The carcass 12 includes a carcass ply 40. In the tire 2, the carcass 12 includes one carcass ply 40. The carcass 12 may also be formed from two or more carcass plies 40.

In the tire 2, the carcass ply 40 extends between the beads 10 on both sides along inner sides of the side walls 6 and the clinches 8. The carcass ply 40 is folded back around the core 36 from an inner side toward an outer side in the axial direction. Due to the folding back, a main part 42 and a folding-back part 44 are formed in the carcass ply 40.

Although not illustrated in the drawings, the carcass ply 40 is formed from a large number of parallel-aligned cords and a topping rubber. An absolute value of an angle that is formed by each of the cords with respect to the equatorial plane ranges from 75 degrees to 90 degrees. In other words, the carcass 12 has a radial structure. A material of the cords is steel. That is, the carcass ply 40 includes steel cords.

In the tire 2, an edge of the folding-back part 44 is positioned between a radial direction outer side edge of the apex 38 and the core 36. A large load acts on the bead 10 portion of the tire 2. A strain tends to concentrate on an edge of the folding-back part 44. In the tire 2, an inner side wall 46, a middle layer 48 and a strip 50 are further provided in the bead 10 portion. These suppress concentration of a strain to the edge of the folding-back part 44.

The belt 14 is positioned on a radial direction inner side of the tread 4. The belt 14 is laminated on the carcass 12. The belt 14 reinforces the carcass 12. In the tire 2, the belt 14 includes a first layer 52, a second layer 54, a third layer 56 and a fourth layer 58. The second layer 54 is positioned on a radial direction outer side of the first layer 52. The third layer 56 is positioned on a radial direction outer side of the second layer 54. The fourth layer 58 is positioned on a radial direction outer side of the third layer 56. In the tire 2, the belt 14 is formed by the four layers. It is also possible that the belt 14 is formed by three layers or two layers. In the tire 2, an edge of the second layer 54 and an edge of the third layer 56 are covered by a cover rubber 60.

As is apparent from FIG. 1, in the tire 2, in the axial direction, among the first layer 52, the second layer 54, the third layer 56 and the fourth layer 58 that form the belt 14, the second layer 54 has the largest width. In the tire 2, an edge of the layer having the largest axial direction width among the multiple layers that form the belt 14, that is, an edge of the second layer 54, is an edge of the belt 14. In the tire 2, an axial direction width of the belt 14 is an axial direction width of the second layer 54.

Although not illustrated in the drawings, the first layer 52, the second layer 54, the third layer 56 and the fourth layer 58 are each formed from a large number of parallel-aligned cords and a topping rubber. A material of the cords is steel. That is, the belt 14 includes steel cords. In each of the layers, the cords are inclined with respect to the equatorial plane. An absolute value of an angle that is formed by each of the cords with respect to the equatorial plane ranges from 15 degrees to 70 degrees.

In the tire 2, in the axial direction, the edge of the belt 14 is positioned near the edge (TE) of the tread surface 28. The belt 14 contributes to the rigidity of the tread 4 portion of the tire 2. In the tire 2, the tread surface 28 is sufficiently in contact with a road surface. From this point of view, the belt 14 has a certain axial direction width. However, when the belt 14 has a large axial direction width, the edge of the belt 14 is close to an outer surface of the tire 2. In this case, a volume of a rubber that surrounds the edges of the belt 14 is insufficient, and there is a risk that damage occurs at the edges of the belt 14. From this point of view, the axial direction width of the belt 14 is properly maintained.

In FIG. 1, an arrow (WT) indicates an axial direction width of the tread surface 28. The width (WT) is an axial direction length from one edge (TE) of the tread surface 28 to the other edge (TE) of the tread surface 28. An arrow (WB) indicates the axial direction width of the belt 14. The width (WB) is an axial direction length from one edge of the belt 14 to the other edge of the belt 14.

In the tire 2, a ration of the width (WB) to the width (WT) is preferably 0.80 or more and 0.95 or less. By setting this ratio to 0.80 or more, the belt 14 can effectively contribute to the rigidity of the tread 4. From this point of view, it is more preferable that this ratio be 0.85 or more. By setting this ratio to 0.95 or less, the edge of the belt 14 is positioned at a proper position. As a result, a sufficient volume of the rubber that surrounds the edges of the belt 14 is ensured. In the tire 2, damage at the edge of the belt 14 is effectively suppressed. From this point of view, it is more preferable that this ratio be 0.90 or less.

The band 16 is positioned on a radial direction outer side of the belt 14. In the tire 2, in the axial direction, the band 16 has a width that is substantially equal to the width of the belt 14. Although not illustrated in the drawings, the band 16 is formed from cords and a topping rubber. The cords are spirally wound. The band 16 has a so-called jointless structure. The cords extend substantially in the circumferential direction. An angle of each of the cords with respect to the circumferential direction is 5 degrees or less, and further, 2 degrees or less. The belt 14 is restrained by the cords. Therefore, lifting of the belt 14 is suppressed. The cords are formed of organic fibers. Examples of preferred organic fibers include nylon fibers, polyester fibers, rayon fibers, polyethylene naphthalate fibers and aramid fibers.

The belt 14 and the band 16 form a reinforcement layer (R). It is also possible that the reinforcement layer (R) is formed from the belt 14 only.

The inner liner 18 is positioned on an inner side of the carcass 12. The inner liner 18 is formed of a crosslinked rubber that is excellent in air impermeability. A typical base rubber of the inner liner 18 is a butyl rubber or a halogenated butyl rubber. The inner liner 18 maintains an internal pressure of the tire 2.

The insulation 20 is sandwiched between the carcass 12 and the inner liner 18. The insulation 20 is formed of a crosslinked rubber that is excellent in adhesiveness. The insulation 20 is firmly bonded to the carcass 12 and is also firmly bonded to the inner liner 18. Due to the insulation 20, peeling of the inner liner 18 from the carcass 12 is suppressed.

The cushion layers 22 are respectively laminated on the carcass 12 in vicinities of the edges of the belt 14. The cushion layers 22 are formed of a soft crosslinked rubber. The cushion layers 22 absorb stresses of the edges of the belt 14. Due to the cushion layers 22, lifting of the belt 14 is suppressed.

The chafers 24 are respectively positioned in vicinities of the beads 18. Although not illustrated in the drawings, when the tire 2 is mounted to a rim, the chafers 24 are in contact with the rim. Due to the contact, the vicinities of the bead 10 are protected. In the present embodiment, the chafers 24 are respectively integrated with the clinches 8. Therefore, the chafers 24 are formed of the same material as the clinches 8. The chafers 24 may be formed from a fabric and a rubber with which the fabric is impregnated.

The fillers 26 are respectively positioned close to the beads 10. The fillers 26 are laminated on the carcass 12. The fillers 26 are respectively folded back around the cores 36 of the beads 10 on radial direction inner sides of the carcass 12. Although not illustrated in the drawings, the fillers 26 are each formed of a large number of parallel-aligned cords and a topping rubber. The cords are each inclined with respect to the radial direction. A material of the cords is steel. The fillers 26 can respectively suppress collapsing of the bead 10 portions. The fillers 26 contribute to durability of the tire 2. In the tire 2, edges of fillers 26 are covered by cover rubbers 62.

In the tire 2, the tread 4 includes a base layer 64 and a cap layer 66. Specifically, the tread 4 of the tire 2 is formed from the base layer 64 and the cap layer 66. That is, the tread 4 is formed by two members. This is because productivity of the tire 2 is impaired when the tread 4 is formed by three members.

The base layer 64 is laminated on the reinforcement layer (R). As is apparent from FIG. 1, in the tire 2, the base layer 64 covers the entire reinforcement layer (R). Edge portions of the reinforcement layer (R) are sandwiched by the base layer 64 and the cushion layer 22. The base layer 64 forms a portion of the side surface 30 of the tread 4. The base layer 64 is bonded to the side walls 6. In the tire 2, the base layer 64 is formed from a crosslinked rubber that is excellent in adhesiveness. A typical base rubber of the base layer 64 is a natural rubber.

The cap layer 66 is positioned on a radial direction outer side of the base layer 64. The cap layer 66 is laminated on the base layer 64. The cap layer 66 forms the tread surface 28. The cap layer 66 forms a portion of the side surface 30 of the tread 4. The cap layer 66 is formed of a crosslinked rubber that is excellent in wear resistance, heat resistance and grip performance. In the tire 2, the cap layer 66 is formed of a rubber similar to a rubber for a conventional cap layer. Therefore, in the tire 2, the cap layer 66 has a loss tangent (TLc) in a range of approximately 0.08-0.15, and a complex elastic modulus (E*c) in a range of approximately 5.0 MPa-7.0 MPa.

In an embodiment of the present invention, a loss tangent (tan δ) and a complex elastic modulus are measured in accordance with provisions of the "JISK6394." In the measurement, a plate-like test specimen (length=45 mm, width=4 mm, thickness=2 mm) is used. The test specimen may be cut out from the tire 2 or from a sheet that is prepared from a rubber composition. Conditions under which the measurement is performed are as follows.

Viscoelasticity Spectrometer: "VESF-3" manufactured by Iwamoto Seisakusho Co., Ltd.
Initial Strain: 10%
Dynamic Strain: ±1%
Frequency: 10 Hz
Deformation Mode: Tensile
Measurement Temperature: 70° C.

In the tire 2, the base layer 64 has a loss tangent (TLb) of 0.06 or less. In the tire 2, the loss tangent (TLb) of the base layer 64 is lower than the loss tangent (TLc) of the cap layer 66. The base layer 64 is less likely to generate heat than the cap layer 66. The base layer 64 is formed of a low heat generation rubber. In the tire 2, the base layer 64 suppresses heat generation of the tire 2 and contributes to reduction in rolling resistance. From this point of view, the loss tangent (TLb) is preferably 0.05 or less and more preferably 0.04 or less. In the tire 2, it is preferable that the loss tangent (TLb) be as low as possible. Therefore, a preferred lower limit of the loss tangent (TLb) is not set.

The low heat generation rubber tends to have a lower rigidity as compared to that of a rubber for which low heat generation is not taken into account. In the cap layer 66 of the tire 2, low heat generation as in the base layer 64 is not taken into account. Therefore, in the tire 2, the rigidity of the base layer 64 is lower than the rigidity of the cap layer 66. Therefore, in the tread 4 that includes the base layer 64 that is formed of a low heat generation rubber, during rolling of the tire 2, there is a risk that movement of the tread 4 relative to a road surface is large and wear progresses in the tread 4. The base layer 64 affects the wear resistance. Further, in the tire 2, the base layer 64 covers an edge portion of the reinforcement layer (R). Therefore, depending on the rigidity of the base layer 64, there is also a risk that a strain concentrates on the edge portion. In this case, there is a concern that damage such as loose may occur.

In the tire 2, it is preferable that a complex elastic modulus (E*b) of the base layer 64 be 3 MPa or more. This allows the base layer 64 to have an appropriate rigidity. In the tire 2, the influence due to the base layer 64 on the wear resistance is suppressed. From this point of view, the complex elastic modulus (E*b) is preferably 3.5 MPa or more, and more preferably 4.0 MPa or more. In the tire 2, it is preferable that the complex elastic modulus (E*b) of the base layer 64 be 6 MPa or less. This allows the rigidity of the base layer 64 to be appropriate maintained. Concentration of strain to an edge of the reinforcement layer (R) is suppressed. Therefore, in the tire 2, damage such as loose is unlikely to occur. From this point of view, the complex elastic modulus (E*b) is preferably 5.5 MPa or less, and more preferably 5.0 MPa or less.

In the tire 2, the base layer 64 extends between one side surface 30 and the other side surface 30 of the tread 4. Similar to the base layer 64, the cap layer 66 also extends between one side surface 30 and the other side surface 30 of the tread 4. As described above, in the tire 2, the cap layer 66 is laminated on the base layer 64. A boundary 68 between the base layer 64 and the cap layer 66 extends between one side surface 30 and the other side surface 30 of the tread 4. In the side surfaces 30 of the tread 4, an edge of each of the side walls 6 is bonded to the tread 4. In the tire 2, a ratio of a volume of the base layer 64 in a volume of the tread 4 is large. The base layer 64 is formed of a low heat generation crosslinked rubber. In the tire 2, the base layer 64 effectively contributes to reduction in rolling resistance.

Figure 2:
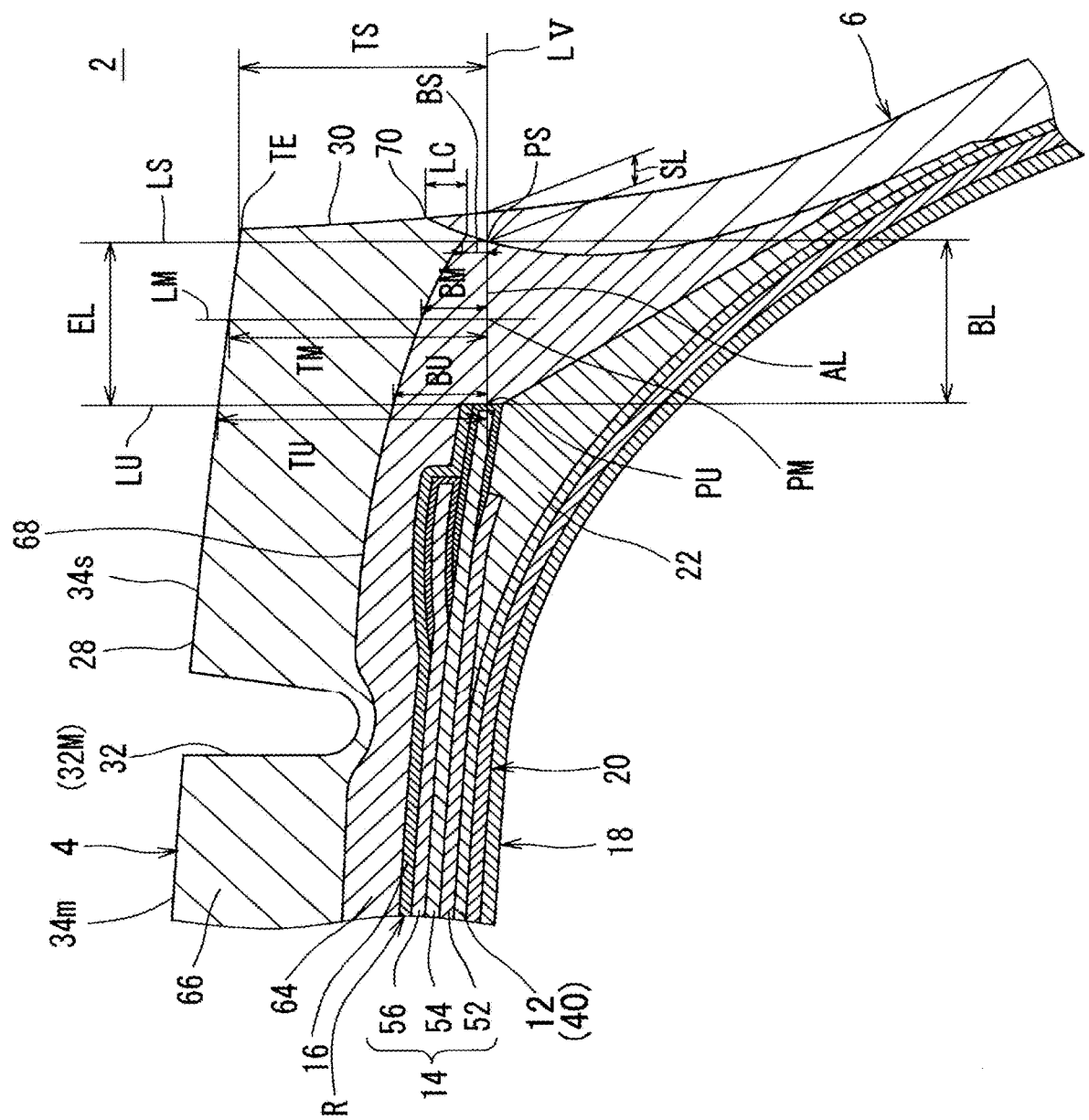
FIG. 2 illustrates an enlarged cross-sectional view in which a portion of the tire of FIG. 1 is illustrated.

FIG. 2 illustrates a shoulder portion of the tire 2. In FIG. 2, an up-down direction is the radial direction of the tire 2; a left-right direction is the axial direction of the tire 2; and a direction perpendicular to a paper surface is the circumferential direction of the tire 2.

In FIG. 2, a solid line (LV) is an imaginary line. The imaginary line (LV) is a straight line that extends in the axial direction. The imaginary line (LV) passes through an edge of the belt 14. In an embodiment of the present invention, of the imaginary line (LV), a portion that intersects the tread 4 is referred to as a line segment (AL). In FIG. 2, a double-headed arrow (EL) indicates a length of the line segment (AL). When the imaginary line (LV) that passes through an edge of the belt 14 and extends in the axial direction is set and the portion of the imaginary line (LV) that intersects the tread 4 is the line segment (AL), the length (EL) is a width of the tread 4, which is represented by the length of the line segment (AL). A double-headed arrow (BL) indicates a width of the base layer 64 included in the line segment (AL).

In the tire 2, the base layer 64 is positioned around the edge of the reinforcement layer (R), in particular, around the edge of the belt 14. In other words, the edge of the belt 14 is covered by the base layer 64. The tread 4 of the tire 2 is formed such that the boundary 68 between the base layer 64 and the cap layer 66 is exposed on the side surfaces 30. In particular, in the tire 2, a ratio of the width (BL) of the base layer 64 to the width (EL) of the tread 4 is 70% or more. In the tire 2, the base layer 64 is provided that has a sufficient volume in the edge portions of the belt 14, that is, in the shoulder portions, of which the movement is large in a traveling state. As described above, the base layer 64 is formed of a low heat generation crosslinked rubber. The base layer 64 suppresses damage such as belt edge loose and contributes to reduction in rolling resistance. From this point of view, it is preferable that this ratio be 90% or more. More preferably, the ratio is 100%, that is, as illustrated in FIG. 2, the entire tread 4 of the line segment (AL) is formed by the base layer 64.

As described above, in the tire 2, the edges of the side walls 6 are respectively positioned on axial direction outer sides of the side surfaces 30 of the tread 4, and the side walls 6 respectively extend from the side surfaces 30 substantially inward in the radial direction. In the tire 2, the boundary 68 that is between the base layer 64 and the cap layer 66 and is exposed on the side surfaces 30 is positioned on a radial direction inner side of edges 70 of the side walls 6. In the tire 2, the base layer 64 is covered by the cap layer 66 and the side walls 6. In other words, in the tire 2, the base layer 64 is not exposed. In the tire 2, occurrence of cracking, which has been confirmed in a conventional tire in which a low heat generation base layer is exposed on side surfaces, is prevented.

In the tire 2, by considering not only from a material aspect but also from a structural aspect, reduction in rolling resistance is achieved while the influence on various performances is suppressed. According to an embodiment of the present invention, the heavy duty pneumatic tire 2 is obtained that allows reduction in rolling resistance to be achieved while allowing influence on various performances to be suppressed.

In FIG. 2, a double-headed arrow (Lc) indicates a radial direction distance from the boundary 68 between the base layer 64 and the cap layer 66 to the edges 70 of the side walls 6. In an embodiment of the present invention, the distance (Lc) is an overlapping length of each of the side walls 6 and the cap layer 66. When the length (Lc) is a positive number, the side walls 6 and the cap layer 66 are in a state in which each of the side walls 6 and the cap layer 66 overlap each other in the axial direction. Therefore, when the length (Lc) is negative number, the edges 70 of the side walls 6 are positioned on a radial direction inner side of the boundary 68, and the side walls 6 and the cap layer 66 are in a state in which each of the side walls 6 and the cap layer 66 do not overlap each other in the axial direction.

As described above, in the tire 2, the boundary 68 between the base layer 64 and the cap layer 66 is positioned on a radial direction inner side of the edges 70 of the side walls 6. That is, in the tire 2, the overlapping length (Lc) is greater than 0 mm. From a point of view of preventing exposure of the base layer 64 and suppressing occurrence of cracking, the length (Lc) is preferably 1 mm or more, more preferably 3 mm or more, and even more preferably 5 mm or more. From a point of view of ensuring the volume of the base layer 64 in the shoulder portions and achieving sufficient reduction in rolling resistance while suppressing occurrence of damage such as loose, the length (Lc) is preferably 20 mm or less, more preferably 18 mm or less, and even more preferably 15 mm or less.

In FIG. 2, a reference numeral symbol (PU) indicates an inner end of the line segment (AL). A solid line (LU) is a straight line that passes through the inner end (PU) and extends in the radial direction. A double-headed arrow (TU) is a radial direction height measured along the straight line (LU) from the line segment (AL) to the tread surface 28. A double-headed arrow (BU) is a radial direction height measured along the straight line (LU) from the line segment (AL) to the boundary 68 between the base layer 64 and the cap layer 66.

In FIG. 2, a reference numeral symbol (PS) indicates an outer end of the line segment (AL). A solid line (LS) is a straight line that passes through the outer end (PS) and extends in the radial direction. A double-headed arrow (TS) is a radial direction height measured along the straight line (LS) from the line segment (AL) to the tread surface 28. A double-headed arrow (BS) is a radial direction height measured along the straight line (LS) from the line segment (AL) to the boundary 68 between the base layer 64 and the cap layer 66.

In FIG. 2, a reference numeral symbol (PM) indicates a midpoint of the line segment (AL). A solid line (LM) is a straight line that passes through the midpoint (PM) and extends in the radial direction. A double-headed arrow (TM) is a radial direction height measured along the straight line (LM) from the line segment (AL) to the tread surface 28. A double-headed arrow (BM) is a radial direction height measured along the straight line (LM) from the line segment (AL) to the boundary 68 between the base layer 64 and the cap layer 66.

In the tire 2, it is preferable that a ratio of the height (BU) to the height (TU) at the inner end (PU) of the line segment (AL) be 30% or more and 40% or less. By setting the ratio to 30% or more, a sufficient volume of the base layer 64 in the shoulder portions is ensured. The base layer 64 suppresses occurrence of damage such as loose and contributes to reduction in rolling resistance. By setting the ratio to 40% or less, the influence of the base layer 64 on the rigidity of the shoulder portions is suppressed. In the tire 2, the rigidity of the shoulder portions is properly maintained and thus, good wear resistance is maintained.

In the tire 2, it is preferable that a ratio of the height (BM) to the height (TM) at the midpoint (PM) of the line segment (AL) be 15% or more and 40% or less. By setting the ratio to 15% or more, a sufficient volume of the base layer 64 in the shoulder portions is ensured. The base layer 64 suppresses occurrence of damage such as loose and contributes to reduction in rolling resistance. By setting the ratio to 40% or less, the influence of the base layer 64 on the rigidity of the shoulder portions is suppressed. In the tire 2, the rigidity of the shoulder portions is properly maintained and thus, good wear resistance is maintained.

In the tire 2, it is preferable that a ratio of the height (BS) to the height (TS) at the outer end (PS) of the line segment (AL) be 0% or more and 20% or less. By setting the ratio to 0% or more, a sufficient volume of the base layer 64 in the shoulder portions is ensured. The base layer 64 suppresses occurrence of damage such as loose and contributes to reduction in rolling resistance. By setting the ratio to 20% or less, the influence of the base layer 64 on the rigidity of the shoulder portions is suppressed. In the tire 2, the rigidity of the shoulder portions is properly maintained and thus, good wear resistance is maintained.

In the tire 2, from a point of view of preventing damage at the edges of the belt 14, a sufficient volume of the rubber that surrounds the edges of the belt 14 is ensured. Therefore, in the tire 2, portions on axial direction outer sides of the edges of the belt 4 are formed of a crosslinked rubber. However, the portions of the side walls 6 respectively extend substantially inward in the radial direction from the shoulder portions of the tire 2. When a load is acting on the tire 2, forces act from the portions of the side walls 6 to the shoulder portions. In the portions on the axial direction outer sides of the edges of the belt 14, a reinforcement layer such as the belt 14 is not provided. Therefore, from a point of view of wear resistance, it is preferable that the shoulder portions be formed such that a portion on an axial direction outer side has a higher rigidity. In particular, as illustrated in FIG. 2, when the entire tread 4 on the line segment (AL) is formed by the base layer 64, it is more preferable that this shoulder portion be formed such that a portion on an axial direction outer side has a higher rigidity. Specifically, it is preferable that this shoulder portion be formed such that the thickness (BM) of the base layer 64 at the midpoint (PM) is smaller than the thickness (BU) of the base layer 64 at the inner end (PU), and the thickness (BS) of the base layer 64 at the outer end (PS) is smaller than the thickness (BM) of the base layer 64 at the midpoint (PM).

In the tire 2, from a point of view of reducing the rolling resistance, it is preferable that a ratio of the thickness (BM) to the thickness (BU) be 60% or more. From a point of view of wear resistance, it is preferable that this ratio be 90% or less.

In the tire 2, from a point of view of reducing the rolling resistance, it is preferable that a ratio of the thickness (BS) to the thickness (BU) be 0% or more. From a point of view of wear resistance, it is preferable that this ratio be 60% or less.

In the tire 2, from a point of view of reducing the rolling resistance, it is preferable that a ratio of the thickness (BS) to the thickness (BM) be 0% or more. From a point of view of wear resistance, it is preferable that this ratio be 80% or less.

In FIG. 2, a double-headed arrow (SL) indicates a width of each of the side walls 6 measured along the imaginary line (LV). In the tire 2, from a point of view of preventing exposure of the base layer 64, the side walls 6 are formed such that the edges 70 of the side walls 6 are respectively positioned on radial direction outer sides of the boundary 68 between the base layer 64 and the cap layer 66. In particular, as illustrated in FIG. 2, when the entire tread 4 on the line segment (AL) is formed by the base layer 64, a volume of the side walls 6 affects the volume of the base layer 64 in the shoulder portions.

In the tire 2, from a point of view of preventing exposure of the base layer 64, it is preferable that the width (SL) of each of the side walls 6 be 3 mm or more. From a point of view of ensuring the volume of the base layer 64 in the shoulder portions, it is preferable that the width (SL) be 5 mm or less.

In FIG. 1, a double-headed arrow (TC) indicates a thickness of the cap layer 66. The thickness (TC) is a length measured along a normal line of the boundary 68 between the base layer 64 and the cap layer 66 from the boundary 68 to the tread surface 28. In an embodiment of the present invention, the thickness (TC) is a minimum thickness at a shoulder rib.

In the tire 2, it is preferable that a difference between the thickness (TC) of the cap layer 66 and the depth (D) of the main grooves (32M) be −3 mm or more. In this case, since the cap layer 66 has a appropriate thickness, even when the tire 2 has traveled a sufficient distance, the cap layer 66 prevented exposure of the base layer 64. In the tire 2, chipping is unlikely to occur. In the tire 2, it is preferable that the difference be 20 mm or less. This allows a ratio of a volume of the cap layer 66 in the volume of the tread 4 to be appropriately maintained. In the tire 2, the effect of reducing the rolling resistance by the base layer 64 is sufficiently achieved.

In FIG. 1, a solid line (LR) is a straight line that extends in the radial direction. The straight line (LR) passes through an edge of the belt 14. A reference numeral symbol (PC) indicates an intersection point of the straight line (LR) and the carcass 12, specifically, an outer-side surface of the carcass 12. A solid line (LPC) is a normal line of the carcass 12 at the intersection point (PC). A double-headed arrow (TT) indicates a thickness of the tread 4 measured along the normal line (LPC). A double-headed arrow (TB) indicates a thickness of the base layer 64 measured along the normal line (LPC).

In the tire 2, it is preferable that a ratio of the thickness (TB) to the thickness (TT) be 50% or more. This allows a sufficient volume of the base layer 64 in the shoulder portions to be ensured. The base layer 64 suppresses occurrence of damage such as loose and contributes to reduction in rolling resistance. From this point of view, it is more preferable that this ratio be 55% or more. From a point of view of suppressing the influence of the base layer 64 on the rigidity of the shoulder portions and maintaining a good wear resistance, it is preferable that this ratio be 80% or less.

In an embodiment of the present invention, dimensions and angles of members of the tire 2 are measured in a state in which the tire 2 is mounted to a normal rim and air is filled in the tire 2 such that the tire 2 has a normal internal pressure. During the measurement, a load is not applied to the tire 2. In the present specification, the term "normal rim" refers to a rim that is defined in the standards that the tire 2 relies on. A "Standard Rim" in JATMA standards, a "Design Rim" in TRA standards, and a "Measuring Rim" in ETRTO standards are normal rims. In the present specification, the term "normal internal pressure" refers to an internal pressure that is defined in the standards that the tire 2 relies on. A "Highest Air Pressure" in the JATMA standards, a "Maximum Value" published in "Tire Load Limits at Various Cold Inflation Pressures" in the TRA standards, and an "Inflation Pressure" in the ETRTO standards are normal internal pressures. In the present specification, the term "normal load" refers to a load that is defined in the standards that the tire 2 relies on. A "Maximum Load Capacity" in the JATMA standards, a "Maximum Value" published in "Tire Load Limits at Various Cold Inflation Pressures" in the TRA standards, and a "Load Capacity" in the ETRTO standards are normal loads.

EXAMPLES

In the following, the effect according to embodiments of the present invention is demonstrated by examples. However, the present invention should not be construed as being limited based on the description of the examples.

Example 1

A tire illustrated in FIGS. 1 and 2 is manufactured. The tire has a size of 11822.5. Specifications of Example 1 are as listed in following Table 1. In Example 1, the loss tangent (TLc) of the cap layer is 0.14. The complex elastic modulus (E*c) of the cap layer is 7.0 MPa.

Example 2-4 and Comparative Example 1 and 2

Tires of Example 2-4 and Comparative Example 1 and 2 are obtained in the same way as in Example 1 except that the ratio (EL/BL) of the width (BL) of the base layer in the width (EL) of the tread, the overlapping length (Lc) of each of the side walls and the cap layer, the ratio (BU/TU) of the height (BU) to the height (TU) at the inner end of the line segment (AL), the ratio (BM/TM) of the height (BM) to the height (TM) at the midpoint of the line segment (AL), the ratio (BS/TS) of the height (BS) to the height (TS) at the outer end of the line segment (AL), the ratio (BM/BU) of the height (BM) to the height (BU), and the ratio (BS/BU) of the height (BS) to the height (BU) are as listed in following Table 1.

Example 5-8 and Comparative Example 3

Tires of Example 5-8 and Comparative Example 3 are obtained in the same way as in Example 1 except that the length (Lc) was as listed in following Table 2. In Comparative Example 3, the edges of the side walls are positioned on a radial direction inner side of the imaginary line (LV) and thus, the width (SL) of each of the side walls measured along the imaginary line (LV) is not set. Further, the ratio (BS/TS) and the ratio (BS/BU) of Comparative Example 3 were 0.

Example 9-19

Tires of Example 9-19 are obtained in the same way as in Example 1 except that the ratio (BU/TU), the ratio (BM/TM), the ratio (BS/TS), the ratio (BM/BU) and the ratio (BS/BU) are as listed in following Table 3-5.

Example 20-22

Tires of Examples 20-22 are obtained in the same way as in Example 1 except that the width (SL) was as listed in following Table 6.

Example 23 and Comparative Example 4

Tires of Example 23 and Comparative Example 4 are obtained in the same way as in Example 1 except that the loss tangent (TLb) of the base layer was as listed in following Table 6.

Example 24-27

Tires of Example 24-27 are obtained in the same way as in Example 1 except that the complex elastic modulus (E*b) of the base layer was as listed in following Table 7.

Rolling Resistance Coefficient

A rolling resistance testing machine is used and a rolling resistance coefficient (RRC) was measured under the following measurement conditions.
Rim: 7.50×22.5 (made of aluminum alloy)
Internal Pressure: 800 kPa
Load: 29.42 kN
Speed: 80 km/h The results are presented in following Table 1-7 as index numbers. A larger numerical number indicates a better rolling resistance coefficient. That is, a larger numerical number indicates a smaller rolling resistance.

SFC Resistance Performance

Each of the tires is mounted to a rim (size=7.50×22.5). Air is filled in the tire such that the internal pressure is the normal internal pressure. Together with the tire of Comparative Example 1, each of the tires is scratch attached to a drum-type running tester, and the normal load is loaded to each of the tires. Each of the tires is run at a speed of 80 km/h on a drum having a radius of 1.7 m. After a mileage of 100,000 km, external appearance of each of the tires is observed. Occurrence cracking on the side surfaces of each of the tires is confirmed, and an evaluation result is expressed as an index number based on the number and sizes of cracks of each of the tires. The results are presented in following Table 1-7. A larger numerical number indicates a better SFC resistance performance. That is, a larger numerical number indicates that occurrence of cracking is more suppressed.

Chipping Resistance Performance

Each of the tires is mounted to a rim (size=7.50×22.5). Air is filled in the tire such that the internal pressure is the normal internal pressure. Together with the tire of Comparative Example 1, each of the tires is scratch attached to a drum-type running tester, and the normal load is loaded to each of the tires. Each of the tires is run at a speed of 80 km/h on a drum having a radius of 1.7 m. After a mileage of 100,000 km, external appearance of each of the tires is observed. Occurrence of chipping is confirmed, and a degree of the chipping (based on sizes and the number of chips) is evaluated and a result is expressed as an index number. The results are presented in following Table 1-7. A larger numerical number indicates a better chipping resistance performance. That is, a larger numerical number indicates that chipping is more suppressed.

TLC Resistance Performance

Each of the tires is mounted to a rim (size=7.50×22.5). Air is filled in the tire such that the internal pressure is the normal internal pressure. Together with the tire of Comparative Example 1, each of the tires is scratch attached to a drum-type running tester, and the normal load is loaded to each of the tires. Each of the tires is run at a speed of 120 km/h on a drum having a radius of 1.7 m, and a time period until TLC occurred is measured. The results are presented in following Table 1-7 as index numbers. A larger numerical number indicates a better TLC resistance performance. That is, a larger numerical number indicates that occurrence of TLC is more suppressed.

Wear Resistance Performance

Each of the tires is mounted to a rim (size=7.50×22.5). Air is filled in the tire such that the internal pressure is the normal internal pressure. Together with the tire of Comparative Example 1, each of the tires is scratch attached to a drum-type running tester, and the normal load is loaded to each of the tires. Each of the tires is run at a speed of 80 km/h on a drum having a radius of 1.7 m. After a mileage of 100,000 km, a wear amount is measured. The results are presented in following Table 1-7. A larger numerical number indicates a better wear resistance performance. That is, a larger numerical number indicates a smaller wear amount and a better wear resistance.

TABLE 1

| | Evaluation Results | | | | | |
|---|---|---|---|---|---|---|
| | Comparative Example 1 | Comparative Example 2 | Example 2 | Example 3 | Example 4 | Example 1 |
| BL/EL [%] | 0 | 50 | 70 | 90 | 100 | 100 |
| Length (Lc) [mm] | 50 | 50 | 50 | 50 | 5 | 5 |
| Loss Tangent (TLb) [—] | 0.040 | 0.040 | 0.040 | 0.040 | 0.040 | 0.040 |
| Elastic Modulus (E*b) [MPa] | 4.5 | 4.5 | 4.5 | 4.5 | 4.5 | 4.5 |
| BU/TU [%] | 0 | 30 | 30 | 30 | 30 | 30 |
| BM/TM [%] | 0 | 0 | 22 | 22 | 22 | 22 |
| BS/TS [%] | 0 | 0 | 0 | 0 | 0 | 7 |
| BM/BU [%] | 0 | 0 | 72 | 72 | 72 | 72 |
| BS/BU [%] | 0 | 0 | 0 | 0 | 0 | 22 |
| Width (SL) [mm] | 3.0 | 3.0 | 3.0 | 3.0 | 3.0 | 3.0 |
| RRC | 100 | 101 | 102 | 103 | 104 | 105 |
| SFC | 100 | 100 | 100 | 100 | 100 | 100 |
| Chipping | 100 | 100 | 100 | 100 | 100 | 100 |
| TLC | 100 | 100 | 100 | 100 | 100 | 100 |
| Wear | 100 | 100 | 100 | 100 | 100 | 100 |

TABLE 2

| | Evaluation Results | | | | |
|---|---|---|---|---|---|
| | Comparative Example 3 | Example 5 | Example 6 | Example 7 | Example 8 |
| BL/EL [%] | 100 | 100 | 100 | 100 | 100 |
| Length (Lc) [mm] | −5 | 3 | 10 | 15 | 18 |
| Loss Tangent (TLb) [—] | 0.040 | 0.040 | 0.040 | 0.040 | 0.040 |
| Elastic Modulus (E*b) [MPa] | 4.5 | 4.5 | 4.5 | 4.5 | 4.5 |
| BU/TU [%] | 30 | 30 | 30 | 30 | 30 |
| BM/TM [%] | 22 | 22 | 22 | 22 | 22 |
| BS/TS [%] | 0 | 7 | 7 | 7 | 7 |
| BM/BU [%] | 72 | 72 | 72 | 72 | 72 |
| BS/BU [%] | 0 | 22 | 22 | 22 | 22 |
| Width (SL) [mm] | — | 3.0 | 3.0 | 3.0 | 3.0 |
| RRC | 106 | 105 | 105 | 103 | 102 |
| SFC | 40 | 98 | 100 | 100 | 100 |
| Chipping | 100 | 100 | 100 | 100 | 100 |
| TLC | 100 | 100 | 100 | 100 | 100 |
| Wear | 100 | 100 | 100 | 100 | 100 |

TABLE 3

| | Evaluation Results | | | |
|---|---|---|---|---|
| | Example 9 | Example 10 | Example 11 | Example 12 |
| BL/EL [%] | 100 | 100 | 100 | 100 |
| Length (Lc) [mm] | 5 | 5 | 5 | 5 |
| Loss Tangent (TLb) [—] | 0.040 | 0.040 | 0.040 | 0.040 |
| Elastic Modulus (E*b) [MPa] | 4.5 | 4.5 | 4.5 | 4.5 |
| BU/TU [%] | 20 | 37 | 40 | 50 |
| BM/TM [%] | 15 | 28 | 30 | 37 |
| BS/TS [%] | 5 | 9 | 9 | 12 |
| BM/BU [%] | 72 | 72 | 72 | 72 |
| BS/BU [%] | 22 | 22 | 22 | 22 |
| Width (SL) [mm] | 3.0 | 3.0 | 3.0 | 3.0 |
| RRC | 102 | 107 | 108 | 110 |
| SFC | 100 | 100 | 100 | 100 |
| Chipping | 100 | 100 | 100 | 100 |
| TLC | 100 | 100 | 100 | 100 |
| Wear | 100 | 100 | 98 | 95 |

TABLE 4

Evaluation Results

|  | Example 13 | Example 14 | Example 15 | Example 16 |
|---|---|---|---|---|
| BL/EL [%] | 100 | 100 | 100 | 100 |
| Length (Lc) [mm] | 5 | 5 | 5 | 5 |
| Loss Tangent (TLb) [—] | 0.040 | 0.040 | 0.040 | 0.040 |
| Elastic Modulus (E*b) [MPa] | 4.5 | 4.5 | 4.5 | 4.5 |
| BU/TU [%] | 30 | 30 | 30 | 30 |
| BM/TM [%] | 19 | 21 | 24 | 28 |
| BS/TS [%] | 7 | 7 | 7 | 7 |
| BM/BU [%] | 61 | 67 | 78 | 89 |
| BS/BU [%] | 22 | 22 | 22 | 22 |
| Width (SL) [mm] | 3.0 | 3.0 | 3.0 | 3.0 |
| RRC | 103 | 104 | 106 | 107 |
| SFC | 100 | 100 | 100 | 100 |
| Chipping | 100 | 100 | 100 | 100 |
| TLC | 100 | 100 | 100 | 100 |
| Wear | 100 | 100 | 100 | 99 |

TABLE 5

Evaluation Results

|  | Example 17 | Example 18 | Example 19 |
|---|---|---|---|
| BL/EL [%] | 100 | 100 | 100 |
| Length (Lc) [mm] | 5 | 5 | 5 |
| Loss Tangent (TLb) [—] | 0.040 | 0.040 | 0.040 |
| Elastic Modulus (E*b) [MPa] | 4.5 | 4.5 | 4.5 |
| BU/TU [%] | 30 | 30 | 30 |
| BM/TM [%] | 22 | 22 | 22 |
| BS/TS [%] | 11 | 14 | 18 |
| BM/BU [%] | 72 | 72 | 72 |
| BS/BU [%] | 33 | 44 | 56 |
| Width (SL) [mm] | 3.0 | 3.0 | 3.0 |
| RRC | 106 | 107 | 108 |
| SFC | 100 | 100 | 100 |
| Chipping | 100 | 100 | 100 |
| TLC | 100 | 100 | 100 |
| Wear | 100 | 100 | 99 |

TABLE 6

Evaluation Results

|  | Example 20 | Example 21 | Example 22 | Example 23 | Comparative Example 4 |
|---|---|---|---|---|---|
| BL/EL [%] | 100 | 100 | 100 | 100 | 100 |
| Length (Lc) [mm] | 5 | 5 | 5 | 5 | 5 |
| Loss Tangent (TLb) [—] | 0.040 | 0.040 | 0.040 | 0.055 | 0.070 |
| Elastic Modulus (E*b) [MPa] | 4.5 | 4.5 | 4.5 | 4.5 | 4.5 |
| BU/TU [%] | 30 | 30 | 30 | 30 | 30 |
| BM/TM [%] | 22 | 22 | 22 | 22 | 22 |
| BS/TS [%] | 7 | 7 | 7 | 7 | 7 |
| BM/BU [%] | 72 | 72 | 72 | 72 | 72 |
| BS/BU [%] | 22 | 22 | 22 | 22 | 22 |
| Width (SL) [mm] | 1.0 | 5.0 | 7.0 | 3.0 | 3.0 |
| RRC | 106 | 105 | 102 | 104 | 101 |
| SFC | 95 | 100 | 100 | 100 | 100 |
| Chipping | 100 | 100 | 100 | 100 | 100 |
| TLC | 100 | 100 | 100 | 100 | 100 |
| Wear | 98 | 100 | 98 | 100 | 100 |

TABLE 7

Evaluation Results

|  | Example 24 | Example 25 | Example 26 | Example 27 |
|---|---|---|---|---|
| BL/EL [%] | 100 | 100 | 100 | 100 |
| Length (Lc) [mm] | 5 | 5 | 5 | 5 |
| Loss Tangent (TLb) [—] | 0.040 | 0.040 | 0.040 | 0.040 |
| Elastic Modulus (E*b) [MPa] | 2.0 | 4.0 | 5.0 | 7.0 |
| BU/TU [%] | 30 | 30 | 30 | 30 |
| BM/TM [%] | 22 | 22 | 22 | 22 |
| BS/TS [%] | 7 | 7 | 7 | 7 |
| BM/BU [%] | 72 | 72 | 72 | 72 |
| BS/BU [%] | 22 | 22 | 22 | 22 |
| Width (SL) [mm] | 3.0 | 3.0 | 3.0 | 3.0 |
| RRC | 105 | 105 | 105 | 105 |
| SFC | 100 | 100 | 100 | 100 |
| Chipping | 100 | 100 | 100 | 100 |
| TLC | 100 | 100 | 100 | 95 |
| Wear | 95 | 100 | 100 | 100 |

As indicated in Table 1-7, the tires of the examples are more highly evaluated than the tires of the comparative example. From the results of the evaluation, advantages according to embodiments of the present invention are clear. The above-described technology related to the tread can also be applied to various tires.

In a tire, from a point of view of reinforcing a carcass, a belt is provided on a radial direction inner side of a tread. The belt includes a large number of parallel-aligned cords.

In a tire in a traveling state, an edge portion of the belt repeats deformation and restoration. Heat is generated in this portion and a strain tends to concentrate on the edge of the belt. The cords included in the belt are covered by a rubber. Steel cords may be used as the cords. Since the rigid cords are covered by the flexible rubber, there is a risk that damage may occur to the rubber positioned around the cords at the edge of the belt. Such damage is also referred to as belt edge loose (BEL). The belt edge loose is also a kind of tread loose casing (TLC).

As compared to a tire for a passenger car, a larger load acts on a heavy duty tire. In a heavy duty tire, damage tends to occur at the edge of the belt.

The tread covers the entire belt. The tread is formed of a crosslinked rubber. From a point of view of suppressing heat generation and preventing damage, various studies have been conducted regarding a structure of the tread.

There is a movement to suppress influence due to a tire on fuel consumption and to be environmentally conscious. In this movement, by adopting a low heat generation rubber for a component, a tire having a small rolling resistance has been developed. For example, when a tread is formed such that an under tread rubber covers an edge of a belt, reduction in rolling resistance may be expected.

However, when adhesiveness is taken into account, a natural rubber may be used for a base rubber of a base layer. The natural rubber contributes to suppression of heat generation, but is susceptible to deterioration due to ozone. A rubber member that includes a natural rubber tends to be poor in weather resistance.

When the under tread rubber is exposed on a side surface of the tire, there is a risk that cracking may occur in the under tread rubber exposed on the side surface. Damage associated with such cracking is also referred to as superficial cracking (SFC).

Even when a low heat generation rubber is adopted in order to reduce rolling resistance, it is possible that performances of the tire such as weather resistance are impaired. To reduce the rolling resistance, in order to suppress the influence on various performances of the tire, not only a material aspect but also a structural aspect are considered.

A heavy duty pneumatic tire according to an embodiment of the present invention allows reduction in rolling resistance to be achieved while allowing the influence on various performances to be suppressed.

A heavy duty pneumatic tire according to an embodiment of the present invention includes a tread, a pair of side walls and a belt. The tread has a tread surface and a pair of side surfaces. The side surfaces respectively extend from edges of the tread surface substantially inward in a radial direction. Edges of the side walls are respectively positioned on axial direction outer sides of the side surfaces. The side walls respectively extend from the side surfaces substantially inward in the radial direction. The belt is positioned on a radial direction inner side of the tread. The tread includes a base layer and a cap layer. The base layer covers the belt. The cap layer is laminated on the base layer. A boundary between the base layer and the cap layer is exposed on the side surfaces. The boundary on the side surfaces is positioned on a radial direction inner side of edges of the side walls. When an imaginary line that passes through an edge of the belt and extends in an axial direction is set and a portion of the imaginary line that intersects the tread is a line segment (AL), a ratio of a width of the base layer in a width of the tread, which is represented by a length of the line segment (AL), is 70% or more. The base layer has a loss tangent of 0.06 or less.

Preferably, in the heavy duty pneumatic tire, an overlapping length of each of the side walls and the cap layer is 20 mm or less.

Preferably, in the heavy duty pneumatic tire, at an inner end of the line segment (AL), a ratio of a radial direction height (BU) from the line segment (AL) to the boundary to a radial direction height (TU) from the line segment (AL) to the tread surface is 30% or more and 40% or less.

Preferably, in the heavy duty pneumatic tire, at a midpoint of the line segment (AL), a ratio of a radial direction height (BM) from the line segment (AL) to the boundary to a radial direction height (TM) from the line segment (AL) to the tread surface is 15% or more and 40% or less.

Preferably, in the heavy duty pneumatic tire, at an outer end of the line segment (AL), a ratio of a radial direction height (BS) from the line segment (AL) to the boundary to a radial direction height (TS) from the line segment (AL) to the tread surface is 0% or more and 20% or less.

Preferably, in the heavy duty pneumatic tire, the base layer has a complex elastic modulus of 3 MPa or more and 6 MPa or less.

Preferably, in the heavy duty pneumatic tire, a width of each of the side walls measured along the imaginary line is 3 mm or more and 5 mm or less.

In a heavy duty pneumatic tire according to an embodiment of the present invention, the tread is formed such that the boundary between the base layer and the cap layer is exposed on the side surfaces. In the tire, when the imaginary line that passes through an edge of the belt and extends in the axial direction is set and the portion of the imaginary line that intersects the tread is the line segment (AL), the ratio of the width of the base layer in the width of the tread, which is represented by the length of the line segment (AL), is 70% or more. In the tire, the base layer is provided that has a sufficient volume in the edge portion of the belt, of which movement is large in a traveling state. In the tire, the base layer is formed of a low heat generation crosslinked rubber. The base layer suppresses damage such as belt edge loose and contributes to reduction in rolling resistance.

In the tire, the edges of the side walls are respectively positioned on axial direction outer sides of the side surfaces. The side walls respectively extend from the side surfaces substantially inward in the radial direction. In the tire, the boundary that is between the base layer and the cap layer and is exposed on the side surfaces is positioned on a radial direction inner side of the edges of the side walls. In the tire, the base layer is covered by the cap layer and the side walls. In other words, in the tire, the base layer is not exposed. In the tire, occurrence of cracking, which has been confirmed in a conventional tire in which a low heat generation base layer is exposed on side surfaces, is prevented.

In the tire, by considering not only from a material aspect but also from a structural aspect, reduction in rolling resistance is achieved while influence on various performances is suppressed. A heavy duty pneumatic tire according to an embodiment of the present invention allows reduction in rolling resistance to be achieved while allowing the influence on various performances to be suppressed.

Obviously, numerous modifications and variations of the present invention are possible in light of the above teachings. It is therefore to be understood that within the scope of the appended claims, the invention may be practiced otherwise than as specifically described herein.

The invention claimed is:

1. A heavy duty pneumatic tire, comprising:
a tread having a tread surface and a pair of side surfaces such that the side surfaces are extending from edges of the tread surface substantially inward in a radial direction, respectively;
a pair of side walls extending from the side surfaces substantially inward in the radial direction respectively such that the side walls have edges positioned on axial direction outer sides of the side surfaces, respectively; and
a belt positioned on a radial direction inner side of the tread,
wherein the tread comprises a base layer covering the belt in an entire width of the belt and a cap layer laminated on the base layer such that the base layer is interposed between the belt and the cap layer, that a boundary between the base layer and the cap layer is exposed on the side surfaces and that the boundary on the side surfaces is positioned on a radial direction inner side of the edges of the side walls, and the tread is formed such that when an imaginary line passing through an edge of the belt and extending in an axial direction is set and a portion of the imaginary line intersecting the tread is a line segment AL, a ratio of a width of the base layer in a width of the tread is 100% where the width of the tread is represented by a length of the line segment AL, and the base layer has a loss tangent of 0.06 or less and a complex elastic modulus in a range of 3 MPa to 6 MPa, and the tread is formed such that an overlapping length of each of the side walls and the cap layer is in the range of 0 mm to 20 mm, that at an inner end of the line segment AL, a ratio of a radial direction height BU from the line segment AL to the boundary to a radial direction height TU from the line segment AL to the tread surface is in a range of 30% to 37%, that at a midpoint of the line segment AL, a ratio of a radial direction height BM from the line segment AL to the boundary to a radial direction height TM from the line segment AL to the tread surface is in a range of 15% or more and 40% or less, and that at an outer end of the line segment AL, a ratio of a radial direction height BS from the line segment AL to the boundary to a radial direction height TS from the line segment AL to the tread surface is in a range of 0% or more and 20% or less.

2. The heavy duty pneumatic tire according to claim 1, wherein the tread is formed such that the overlapping length of each of the side walls and the cap layer is in a range of 3 mm to 15 mm.

3. The heavy duty pneumatic tire according to claim 1, wherein the tread is formed such that the overlapping length of each of the side walls and the cap layer is in a range of 5 mm to 15 mm.

4. The heavy duty pneumatic tire according to claim 1, wherein the base layer has a complex elastic modulus in a range of 4.0 MPa to 5.0 MPa.

5. The heavy duty pneumatic tire according to claim 4, wherein each of the side walls is formed such that a width of each of the side walls measured along the imaginary line is in a range of 3 mm or more and 5 mm or less.

6. The heavy duty pneumatic tire according to claim 1, wherein each of the side walls is formed such that a width of each of the side walls measured along the imaginary line is in a range of 3 mm or more and 5 mm or less.

7. The heavy duty pneumatic tire according to claim 6, wherein the tread is formed such that the overlapping length of each of the side walls and the cap layer is in a range of 3 mm to 15 mm.

8. The heavy duty pneumatic tire according to claim 6, wherein the tread is formed such that the overlapping length of each of the side walls and the cap layer is in a range of 5 mm to 15 mm.

9. The heavy duty pneumatic tire according to claim 1, wherein the base layer has a complex elastic modulus in a range of 3.5 MPa to 5.5 MPa.

10. The heavy duty pneumatic tire according to claim 9, wherein each of the side walls is formed such that a width of each of the side walls measured along the imaginary line is in a range of 3 mm or more and 5 mm or less.

11. The heavy duty pneumatic tire according to claim 10, wherein the tread is formed such that the overlapping length of each of the side walls and the cap layer is in a range of 5 mm to 15 mm.

12. The heavy duty pneumatic tire according to claim 10, wherein the tread is formed such that the overlapping length of each of the side walls and the cap layer is in a range of 3 mm to 15 mm.

13. The heavy duty pneumatic tire according to claim 9, wherein the tread is formed such that the overlapping length of each of the side walls and the cap layer is in a range of 3 mm to 15 mm.

14. The heavy duty pneumatic tire according to claim 9, wherein the tread is formed such that the overlapping length of each of the side walls and the cap layer is in a range of 5 mm to 15 mm.

15. The heavy duty pneumatic tire according to claim 1, wherein the tread is formed such that the overlapping length of each of the side walls and the cap layer is in a range of 1 mm to 18 mm.

16. The heavy duty pneumatic tire according to claim 15, wherein the base layer has a complex elastic modulus in a range of 3.5 MPa to 5.5 MPa.

17. The heavy duty pneumatic tire according to claim 16, wherein each of the side walls is formed such that a width of each of the side walls measured along the imaginary line is in a range of 3 mm or more and 5 mm or less.

18. The heavy duty pneumatic tire according to claim 15, wherein each of the side walls is formed such that a width of each of the side walls measured along the imaginary line is in a range of 3 mm or more and 5 mm or less.

19. The heavy duty pneumatic tire according to claim 15, wherein the base layer has a complex elastic modulus in a range of 4.0 MPa to 5.0 MPa.

20. The heavy duty pneumatic tire according to claim 19, wherein each of the side walls is formed such that a width of each of the side walls measured along the imaginary line is in a range of 3 mm or more and 5 mm or less.

* * * * *